(No Model.)

A. VAIL.
MACHINE FOR CUTTING, EXPANDING, AND BEADING BOILER FLUES.

No. 440,797. Patented Nov. 18, 1890.

Witnesses:

Inventor:
Allen Vail,
by Michael J. & Wm. O. Stark,
Attorneys.

UNITED STATES PATENT OFFICE.

ALLEN VAIL, OF BUFFALO, NEW YORK, ASSIGNOR OF ONE-HALF TO JAMES CUMMING, OF SAME PLACE.

MACHINE FOR CUTTING, EXPANDING, AND BEADING BOILER-FLUES.

SPECIFICATION forming part of Letters Patent No. 440,797, dated November 18, 1890.

Application filed October 21, 1889. Serial No. 327,669. (No model.)

*To all whom it may concern:*

Be it known that I, ALLEN VAIL, of Buffalo, in the county of Erie and State of New York, have invented certain new and useful Improvements on Machines for Cutting, Expanding, and Beading Boiler-Flues; and I do hereby declare that the following description of my said invention, taken in connection with the accompanying sheet of drawings, forms a full, clear, and exact specification, which will enable others skilled in the art to which it appertains to make and use the same.

This invention has general reference to improvements in machines for cutting, expanding, and beading boiler-flues; and it consists, essentially, in the novel and peculiar combination of parts and details of construction, as hereinafter first fully set forth and described, and then pointed out in the claims.

Figure 3:
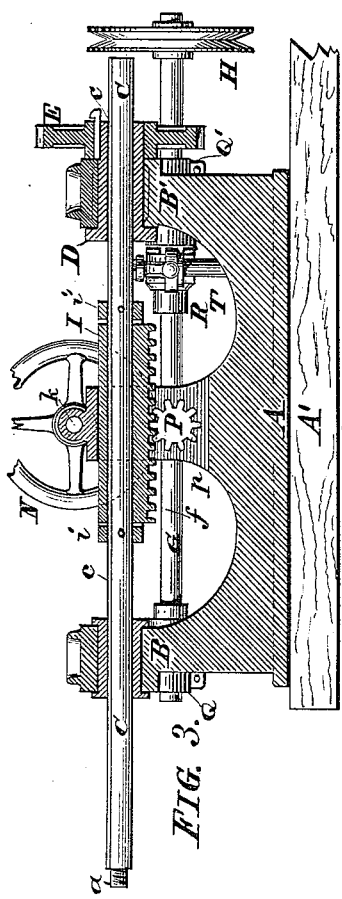
Figure 1:
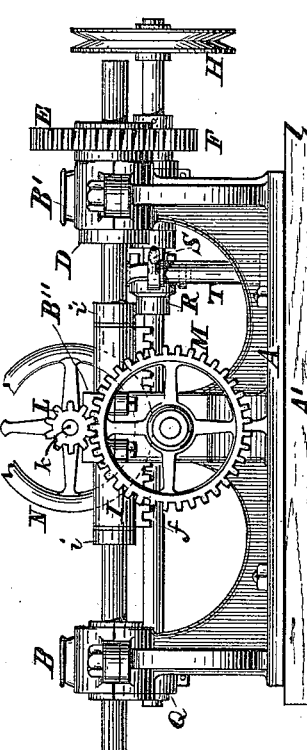
Figure 2:
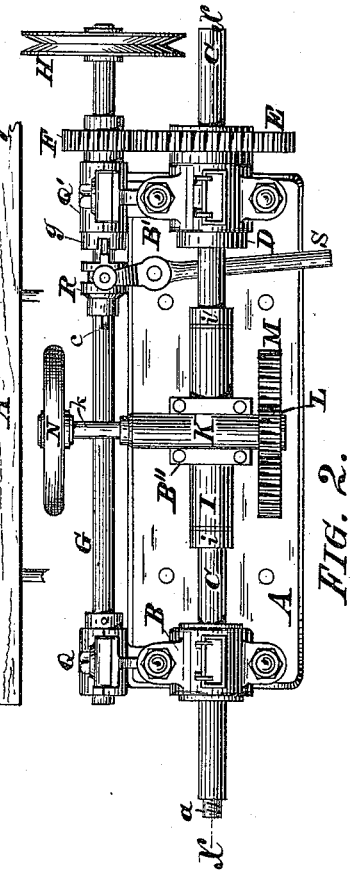
Figure 4:
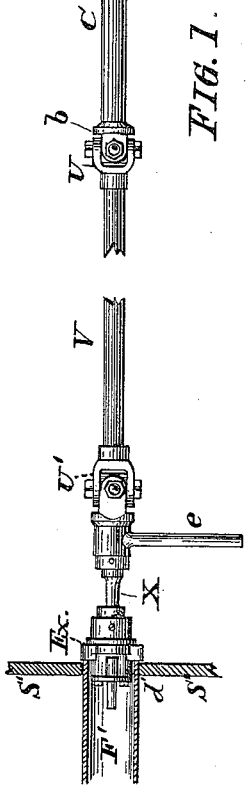
Figure 4:
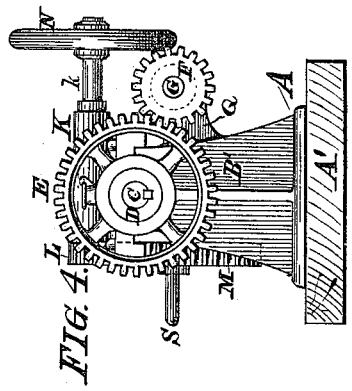

In the drawings already mentioned, which serve to illustrate my said invention more fully, Figure 1 is a side elevation of my improved machine. Fig. 2 is a plan of the same. Fig. 3 is a longitudinal sectional elevation in line $x$ $x$ of Fig. 2. Fig. 4 is an end elevation of the same.

Like parts are designated by corresponding letters of reference in all the figures.

The object of this invention is the production of a simple and efficient machine wherewith to either cut or expand and bead the flues of locomotive and other steam boilers by power applied thereto in any convenient manner.

Heretofore, as far as I am aware, the ends of boiler-flues have been expanded and beaded by means of devices operated by hand, which is rather a laborious and slow method of accomplishing the desired result. This I design to overcome by applying power from any suitable motor to the expanding mandrel through the intervention of a machine consisting, essentially, of a bed-plate A, having three fixed standards B B' B'', carrying a shaft or spindle C, having near one end a sleeve D and a spur-wheel E on the sleeve meshing with a pinion F, fixed to the end of a sleeve $g$, revolving in a bearing Q', fixed to or formed in one piece with the standard B', said sleeve being operated by a shaft G and a clutch R, feathered in the spline $c$ in an obvious manner. One end of this shaft G has a rope-sheave H, which, preferably, receives motion from any suitable source through a rope-driving mechanism (not shown) in the well-known manner. The other end of this shaft G revolves in a bearing Q, fixed to the standard B in a manner similar to that formed on the standard B'.

The spindle C revolves with a sleeve D (to which the spur-wheel E, already mentioned, is affixed) in the bearing B', and also in a cylindrical tubular guide-piece I, moving laterally only in the central standard B''. The cap of this standard is fitted transversely with a bearing K to receive a spindle $k$, one end of which carries a pinion L and the opposite end a hand-wheel N, said pinion engaging a spur-wheel M, fixed to a spindle having a pinion P, as clearly illustrated in Fig. 3. This pinion P engages a rack $f$ on the tubular guide-piece I and moves it laterally, according to which direction the hand-wheel N is revolved. Upon the spindle C at both ends of the tubular guide-piece I are placed collars $i$ $i'$, respectively, which allow said spindle being moved laterally with said guide-piece at the same time that it is revolved by the gear-wheel E.

The forward end of the spindle C is screw-threaded at $a$ to receive a universal-joint connection U by the collar $b$, a preferably tubular rod V of suitable length being secured to said universal joint U and having on its opposite end a further universal joint U', to which in turn is affixed a taper mandrel X, having a swivel-handle $e$, all as clearly shown in Fig. 1. Upon this mandrel is placed a tube-expander Ex, or other suitable tool for either cutting, expanding, or beading a boiler-flue F' in the tube-sheet S', rollers $d$ in said expander Ex of the well-known construction being employed when expanding said flue F'.

The operation of this device is substantially as follows: Assuming that the apparatus is to be used for expanding the flues of a locomotive-boiler, &c., it is placed upon a plank A' and the latter fastened to any object connected with said boiler. The sheave H is then revolved and the hand-wheel N turned until the taper mandrel X engages the rollers $d$ in the expander and causes them to revolve. This will expand the flue F' at the place where it passes through the flue-sheet S' and continues to do so as long as the mandrel X is revolved and moved laterally toward the said flue-sheet. To stop the machine, the clutch R is moved by the hand-lever S in the proper direction. Owing to the universal-joint connection U U' of the rod V, the mandrel and expander can be moved from one to the other flue in the flue-sheet without removing or changing the position of the machine until all the flues in the end of a boiler are expanded and beaded. It will thus be seen that this device is a great labor-saving machine, and that it will do the work of a workman in a fraction of the time in which it can be done by hand, beside doing the work in a better and more workman-like manner. To move the expander from one to the other tube, the swivel-handle e is resorted to in an obvious manner.

Having thus fully described my invention, I claim as new and desire to secure to me by Letters Patent of the United States—

1. In boiler-flue expanders, a device for revolving the mandrel of such expander, consisting, essentially, of a spindle having a universal-joint connection with said mandrel, a tubular guide-piece having a rack and a pinion mechanism gearing with said rack for moving said spindle longitudinally, a sleeve around said spindle having a gear-wheel engaging a loose pinion, a shaft for driving said pinion, and a clutch to connect said pinion with the shaft, and a pulley for revolving said shaft, all as hereinbefore set forth and described.

2. In flue-expanding machines, the combination, with the taper mandrel X, of a shaft V, having universal-joint connections U U' between the mandrel and the spindle, and a spindle C, having suitable mechanism for revolving and laterally moving the same, whereby said taper mandrel is operated in a manner as and for the object stated.

3. In machines for expanding the flues of steam-boilers, the combination, with the taper mandrel X, of a flue-expander Ex, a rod V, having universal-joint connections U U', a spindle C between the mandrel and spindle, a tubular guide-piece I, a bed-plate A, having standards B B' B'', the latter carrying a bearing K, with spindle k, pinion L, spur-wheel M, and pinion P, engaging the rack f on said guide-piece, and suitable mechanism for revolving said spindle, as and for the purpose set forth.

4. A machine for expanding and beading boiler-flues *in situ*, consisting, essentially, of the tool Ex, having the taper mandrel X, provided with a handle e, and the universal joint U', consisting of two double eyes connected to a central connecting-piece, the rod V, having the universal joint U, the main spindle C, having tubular guide-piece I, bed-plate A, having standards B B' B'', the latter carrying the bearing K, with spindle k, pinion L, spur-wheel N, and pinion P, engaging the rack f on the guide-piece, the gear-wheel E on the sleeve D, the counter-shaft G, having the clutch R, the sleeve g, having the gear-wheel F, and the driving-pulley G, as and for the object set forth.

In testimony that I claim the foregoing as my invention I have hereunto set my hand in the presence of two subscribing witnesses.

A. VAIL.

Attest:
MICHAEL J. STARK,
WM. O. STARK.